W. B. THOMAS.
STEERING DEVICE.
APPLICATION FILED JUNE 30, 1916.
1,226,411.
Patented May 15, 1917.
3 SHEETS—SHEET 1.
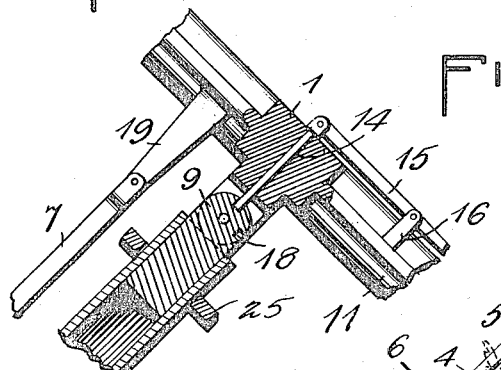
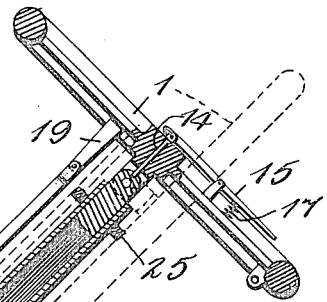
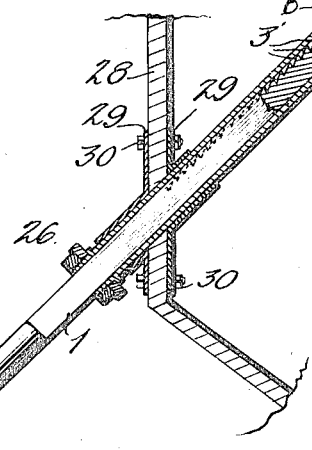
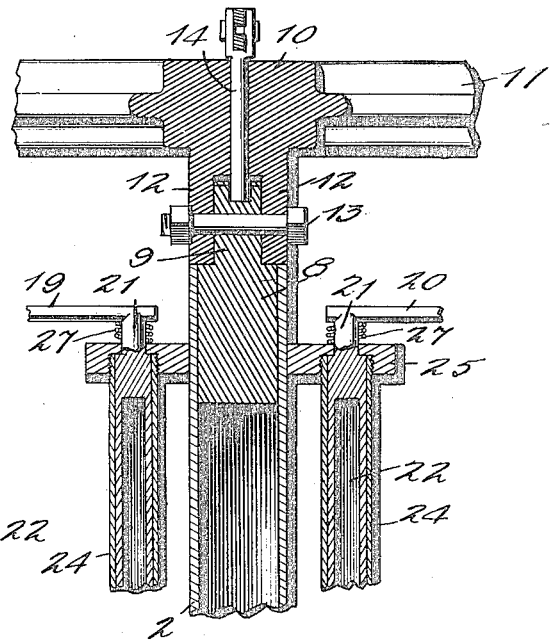
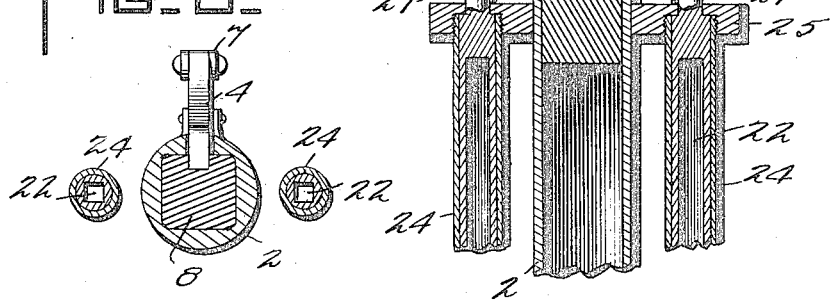
WITNESSES
INVENTOR
WILLIAM B. THOMAS,
BY
ATTORNEYS W. B. THOMAS.
STEERING DEVICE.
APPLICATION FILED JUNE 30, 1916.
1,226,411.
Patented May 15, 1917.
3 SHEETS—SHEET 2.
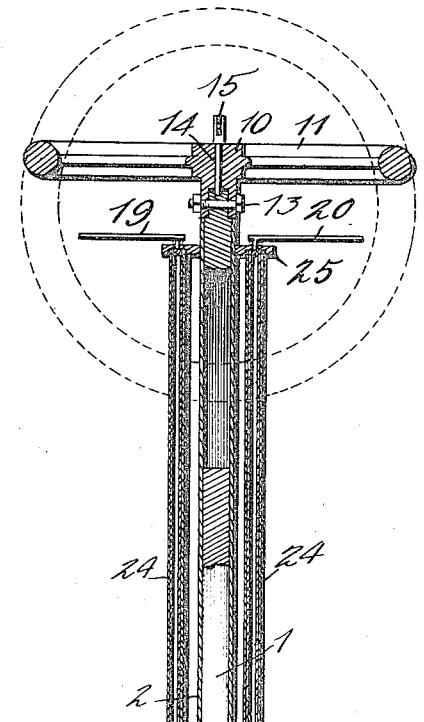
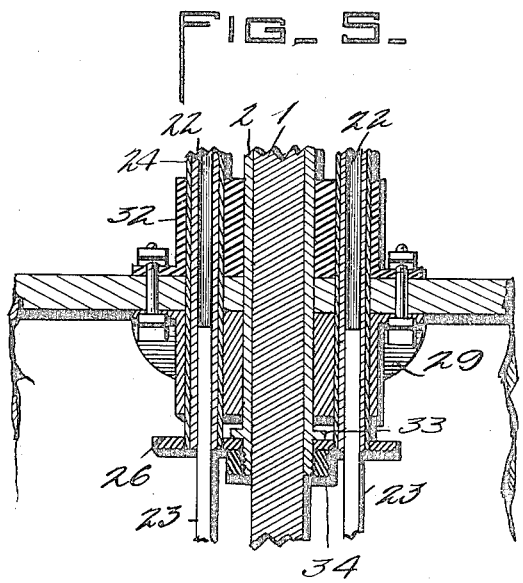
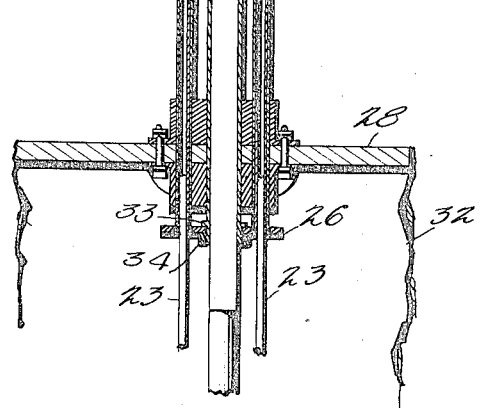
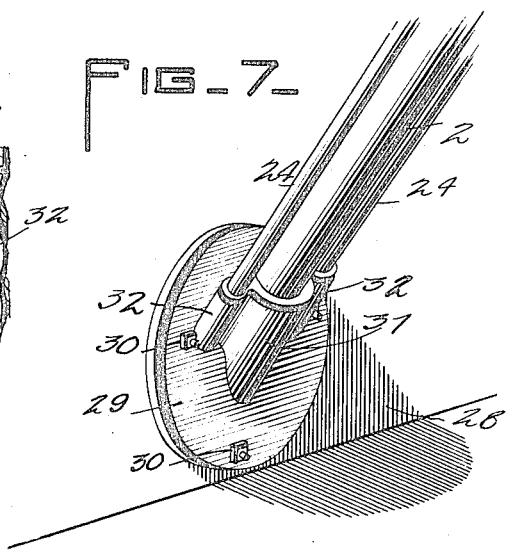
WITNESSES
INVENTOR
WILLIAM B. THOMAS,
BY
ATTORNEYS

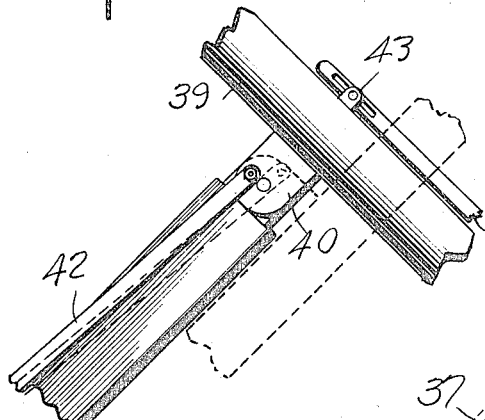
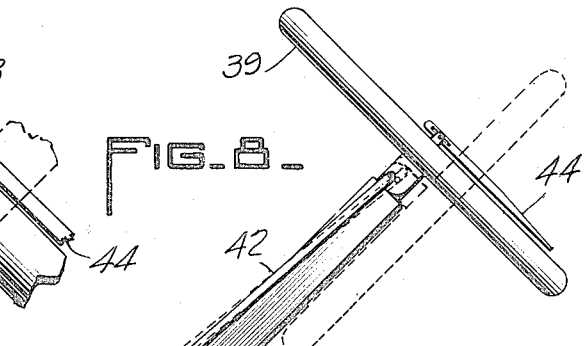
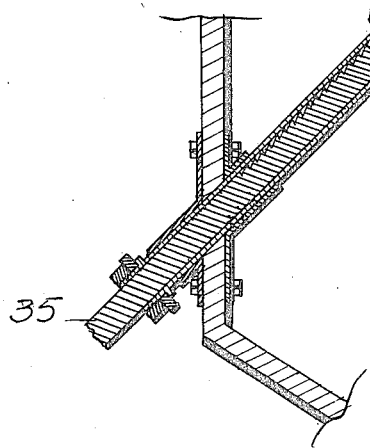
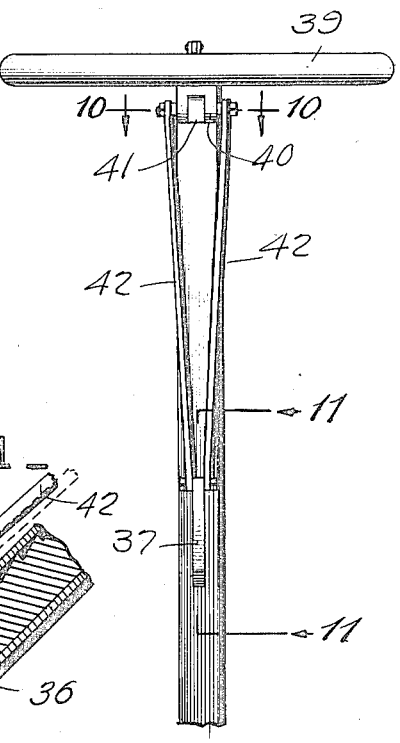
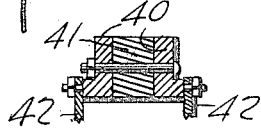
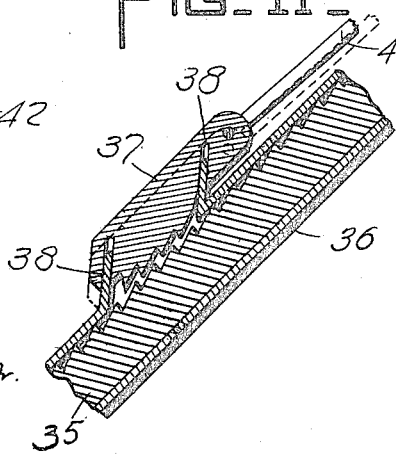

UNITED STATES PATENT OFFICE.

WILLIAM BAILEY THOMAS, OF JACKSONVILLE, FLORIDA.

STEERING DEVICE.

1,226,411.

Specification of Letters Patent.

Patented May 15, 1917.

Application filed June 30, 1916. Serial No. 106,862.

*To all whom it may concern:*

Be it known that I, WILLIAM B. THOMAS, a citizen of the United States, and a resident of Jacksonville, in the county of Duval and State of Florida, have invented an Improvement in Steering Devices, of which the following is a specification.

My invention is an improvement in steering devices for motor vehicles and the invention has for its object to provide a steering device, wherein the column and the controlling devices for the motor are adjustable in length, and wherein the wheel may be folded into the plane of the column, and wherein the act of folding the wheel into the plane of the column will collapse the column and the controlling mechanism, and wherein the moving of the wheel into a plane transverse to the axis of the column will lock the column in adjusted position.

A further object is to provide mechanism in connection with the wheel and the column, for permitting the wheel to be folded into the plane of the column and the column collapsed, or the wheel to be moved into operative position and the column extended, by a single movement.

In the drawings:

Figure 1 is a longitudinal section of the steering device with the column extended.

Fig. 2 is a section at right angles to Fig. 1.

Fig. 3 is an enlarged view of the top portion of Fig. 1.

Fig. 4 is a similar view of Fig. 2.

Fig. 5 is an enlarged view of the lower portion of Fig. 2.

Fig. 6 is a section on the line 6—6 of Fig. 1.

Fig. 7 is a perspective view of the guide plate and tube.

Fig. 8 is a sectional view of a modified construction.

Fig. 9 is a front view of the same.

Fig. 10 is a section on the line 10—10 of Fig. 9, looking in the direction of the arrows adjacent to the line.

Fig. 11 is a section on the line 11—11 of Fig. 9, looking in the direction of the arrows adjacent to the line.

Fig. 12 is an enlarged partial side view.

In the present embodiment of the invention, the steering column is sectional, consisting of a lower solid cylindrical inner section 1, and an upper chambered or shell like outer section 2, the section 2 being mounted to slide upon the section 1. The section 1 of the column is provided at its upper or front surface with a longitudinally extending series of upwardly facing ratchet teeth, and a ratchet lever is journaled on the outer section for coöperating with the teeth.

This lever 4 is an elbow lever, pivoted to the outer casing as indicated at 5, at a slot 6 extending longitudinally of the shell, and one portion of the lever extends through the slot and has teeth for engaging the teeth 3. The other portion of the lever extends outwardly at an acute angle to the first-named portion, and one end of a link 7 is pivoted to the said portion.

The upper end of the section 2 is made solid, by the insertion of a plug 8, and the said plug is polygonal in cross section, as shown in Fig. 6, and fits a similarly shaped bore or recess in the section 2, in order that the plug may not turn in the section. That portion of the plug which extends beyond the end of the section is flattened or cut away at opposite sides, to form a bearing lug 9, and the hub 10 of the steering wheel 11 has a pair of laterally spaced axially extending bearing lugs 12 which engage opposite sides of the lug 9, and a bolt and nut 13 is provided for connecting the lugs 9 and 12. The wheel 11 is thus pivoted to the outer section of the column to swing into a plane parallel with the axis of the column, or into a plane perpendicular to the said axis, and latch mechanism is provided for locking the wheel in either position.

The said mechanism comprises a latch pin 14 mounted to move in an opening at the axis of the wheel, and the latch pin is pivoted to one end of the latch lever 15 with a lost motion connection, as shown in Figs. 1 and 3. The lever 15 is pivoted between bearing lugs 16 on one of the spokes of the wheel, and the opposite end of the lever extends to near the rim of the wheel at the rear or lower portion thereof. A spring 17 is arranged between the outer end of the lever and the spoke for normally holding the pin in engaged position, and the pin is adapted to coöperate with openings 18 in the rounded upper end of the lug 9, the said lug serving as a latch bar for the latch pin. The wheel 11 is provided at the opposite side from the latch lever 15 with a lug 19ª extending longitudinally of the wheel, and the end of the link 7 remote from the elbow lever is pivoted to the lug 19ª.

In operation, the latch pin 14 normally holds the wheel in the full line position of Fig. 1, and when the wheel is in this position, and in a plane transverse to the axis of the steering column, the link 7 holds the ratchet lever 4 in firm engagement with the teeth 3, to prevent movement of the wheel forwardly and downwardly. When in this position, the steering column may be turned, because the section 2 of the steering column must turn with the wheel, and the inner section 1 must turn with the outer section 2.

When desired, however, the wheel may be turned into the dotted line position of Fig. 1, by releasing the latch pin, and turning the wheel into this position. This movement of the wheel makes upward traction on the link 7, releasing the ratchet lever 4 from the teeth 3, and the outer section 2 may be moved downward, sliding on the inner section, to lower the wheel.

With the improved steering mechanism, the wheel may be arranged at either side of the car without hindering the ingress or egress, for by collapsing the wheel and the steering column, it is moved out of the way of any one when leaving the car. To extend the wheel it is only necessary to grasp the lower portion thereof and pull upward. This movement swings the wheel into operative position, and extends the steering column, the ratchet lever slipping idly over the teeth.

The lever, however, prevents downward movement of the sections with respect to each other, while permitting free upward movement. With this form of steering wheel, the wheel may be arranged at the right of the vehicle as advantageously as at the left. In case of accident the driver is not hemmed in his seat by a fixed wheel, since with a single movement he may collapse the wheel and the steering column, leaving him ample room for escape.

In the usual construction of automobiles, the controlling devices for the motor are supported by the wheel, namely the spark control and the throttle lever. These devices are controlled by arms 19 and 20 extending radially from sectional shafts which are mounted at opposite sides of the column, and are supported thereby, and are movable therewith. Each arm 19 and 20 is connected to the upper reduced end 21 of the hollow or chambered outer section 22 of a shaft, consisting of the said section 22 and a solid inner section 23, which is mounted to slide in the outer section.

Referring to Fig. 6 it will be noticed that the outer sections 22 of the sectional shafts have a polygonal bore or recess, and the solid lower sections 23 are shaped to fit within these recesses, the said sections being polygonal in cross section. Thus while the sections 22 and 23 of each control shaft must rotate together, they can move longitudinally with respect to each other without interfering with the control.

Each of the outer sections 22 of the control shafts is mounted in a tubular casing 24, and the said casings 24 are held between yokes 25 and 26 at the opposite ends of the said casings. The yoke 25 connects the sections 22 at their upper ends as shown more particularly in Fig. 4, and this yoke is journaled on the outer section 2 of the steering column near the upper end of the said column. The upper ends of the casings 24 are threaded into reamed counterbored openings, in the yoke, and the reduced portions 21 of the sections 22 of the control shafts pass through the openings.

Each reduced portion is encircled by a spring 27, which is arranged between the handle 19 or 20, as the case may be, and the yoke. The yoke 26 which connects the lower ends of the casings 24 has a central opening, through which the lower end of the section 2 of the steering column is passed, the section 1 extending through the said opening. The section 1 has a rigid collar 33 above the yoke, and a nut 34 is threaded onto the section below the yoke. Since both yokes 25 and 26 and both casings 24 are supported by the outer section 2 of the steering column, and movable therewith, it is obvious that the control shafts will collapse with the steering column. At the point where the steering column passes through the foot board 28 of the vehicle, a guide is arranged, the said guide being secured to the foot board. This guide is sectional, consisting of an inner section and an outer section, each of which is flanged, as indicated at 29, to engage the foot board, and the flanges are connected to the foot board by means of bolts and nuts 30. Each guide provides tubular members 31 and 32 for the section 2 of the steering column and the tubular casings 24, respectively, and the said column section and casings are slidable in the guide sections.

The holding mechanism for the steering column sections is also the holding mechanism for the control shafts, and when this mechanism is released, there is nothing to prevent the immediate collapse of the control shafts. In case of accident to the vehicle, a simple pressure on the lever 15 to release the latch pin 14 is all that is necessary to collapse the wheel and column. The wheel immediately moves into the dotted line position of Fig. 1, releasing the steering column sections from each other, and the weight of the wheel and attached parts will collapse the column and the control shafts.

The provision of the collar 33 and the nut 34 permits the steering column to rotate with respect to the yokes, in order to permit the steering of the vehicle.

In the embodiment of the invention shown in Figs. 8 to 12 the inner section 35 of the steering column, which is slidable in the outer section 36, has teeth, which are adapted to be engaged by a toothed latch member 37. This latch member is mounted on inclined parallel guide lugs 38, which are so arranged that when the latch member is moved toward the steering wheel 39 it will be lifted out of engagement with the teeth, while when it is moved in the opposite direction it will be moved into engagement with the teeth. The wheel 39 has spaced lugs 40, which fit on opposite sides of a lug 41 on the outer section of the steering column, and are pivoted thereto. Links 42 connect the latch bar 37 with the lugs, the connection of the links being eccentric, in order that when the wheel is turned on its pivotal connection the latch bar will be moved. This lug 40 has the notches for engagement by the latch pin 43, which is operated by the lever 44 in the same manner as in the construction shown in Figs. 1 to 7, and the steering column is mounted in the same manner.

It will be understood that the present form of latch mechanism may be used in the construction shown in Fig. 1, and since the control shafts and their mounting is the same, said shafts and mounting are not shown in the embodiment of Figs. 8 to 12.

I claim:

1. A steering device for motor vehicles, comprising a steering column composed of telescoping sections, and a wheel pivoted to the uppermost section to swing into planes transverse to the axis of the column or parallel therewith, releasable latch mechanism for holding the wheel in either position, means for preventing downward movement of the upper section with respect to the lower section and controlled by the movement of the wheel into a plane transverse to the column, to lock the sections from downward movement and to release the said sections when the wheel is moved into a plane parallel with the axis of the column.

2. A steering device for motor vehicles, comprising a steering column composed of telescoping sections, and a wheel pivoted to the uppermost section to swing into planes transverse to the axis of the column or parallel therewith, releasable latch mechanism for holding the wheel in either position, means for preventing downward movement of the upper section with respect to the lower section and controlled by the swinging movement of the wheel.

3. A steering device for motor vehicles, comprising a steering column composed of telescoping sections, and a wheel pivoted to the uppermost section to swing into planes transverse to the axis of the column or parallel therewith, and means for preventing downward movement of the upper section with respect to the lower section and controlled by the swinging movement of the wheel.

4. A steering device for motor vehicles, comprising a collapsible steering column, and a wheel pivoted to the top of the column to swing into transverse planes to the axis of the column or parallel therewith, means for preventing the collapsing of the column and controlled by the swinging of the wheel, and collapsible control shafts supported by the column and movable therewith.

5. A steering device for motor vehicles, comprising a collapsible steering column, and a wheel pivoted to the top of the column to swing into planes transverse to the axis of the column or parallel therewith, means for preventing the collapsing of the column and controlled by the swinging of the wheel.

6. A steering device for motor vehicles, comprising a collapsible steering column, and a wheel pivoted to the top of the column to swing into planes transverse to the axis of the column or parallel therewith, and means controlled by the swinging of the wheel for collapsing the column.

7. A steering device for motor vehicles comprising a collapsible steering column, a wheel pivoted to the top of the column to swing into planes transverse to the axis of the column or parallel therewith, means controlled by the swinging of the wheel for collapsing the column and collapsible control shafts supported by the column and movable therewith.

8. A steering device for motor vehicles, comprising a collapsible steering column, a wheel pivoted to the column, means for restraining the collapsing of the column and connected to the wheel to be released when the wheel is swung in a predetermined direction.

9. A steering device for motor vehicles comprising a collapsible steering column, pawl and ratchet mechanism for holding the column in adjusted position, and arranged to permit the column to be extended freely to prevent the collapse thereof, a steering wheel pivoted to the column, and a connection between the said wheel and the pawl and ratchet mechanism for releasing the same when the wheel is swung in a predetermined direction.

10. In a steering device for motor vehicles, the combination with a steering column, of a wheel pivoted to the top thereof and adapted to swing into planes transverse to the axis of the column and parallel therewith, a latch mechanism for holding the wheel in the first named position, said column being collapsible and having means for holding the same extended and connected with the wheel to be released when the wheel is turned into parallelism with the column.

11. A steering device for motor vehicles comprising a collapsible steering column, and a wheel pivoted to the column and controlling the collapsing of the column.

WILLIAM BAILEY THOMAS.